Figure 1:
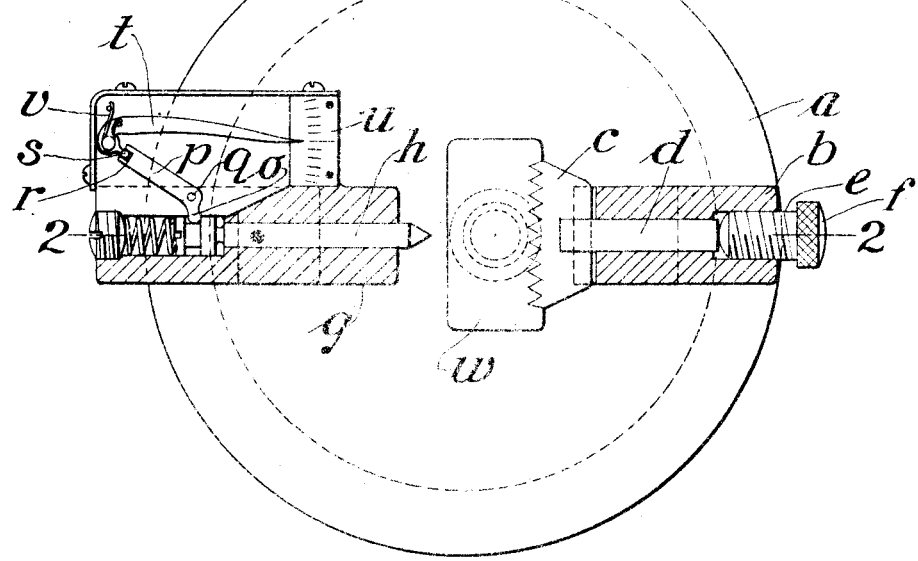

F. O. WELLS & F. JUDGE.
CALIPERING GAGE FOR SCREW THREADS.
APPLICATION FILED JUNE 19, 1913.

1,090,180.

Patented Mar. 17, 1914.
3 SHEETS—SHEET 1.

WITNESSES:
M. A. Hunter
H. E. Hartwell

INVENTORS
Frank O. Wells and
Franklin Judge.
BY
Chapin & Co.
ATTORNEYS

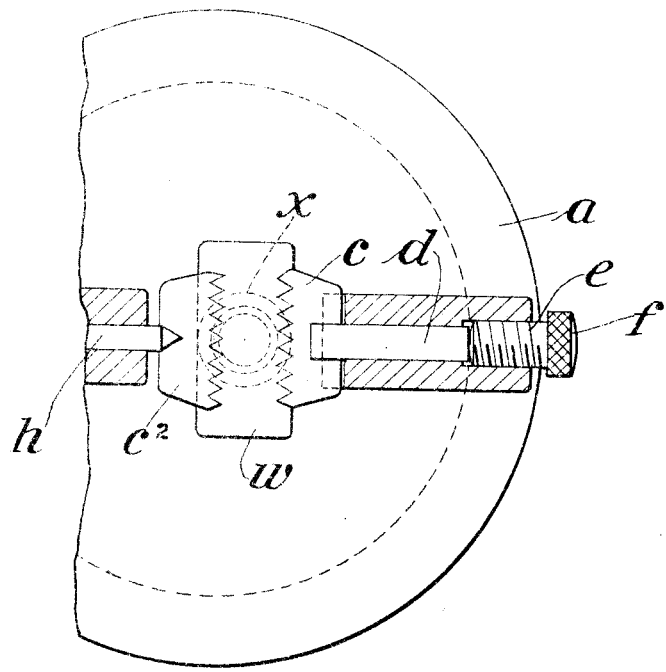
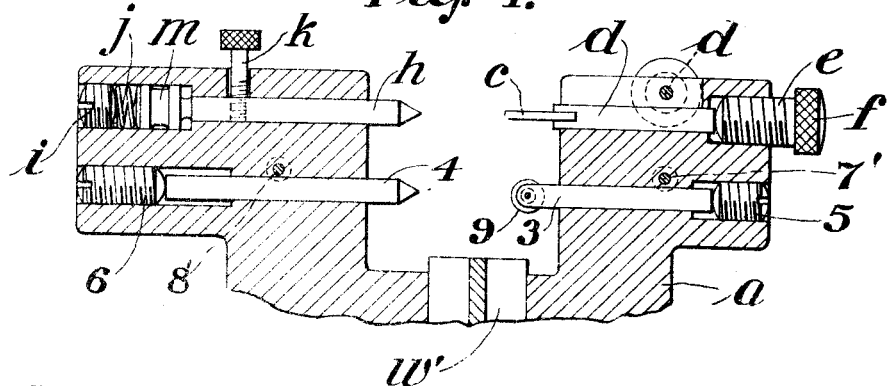

F. O. WELLS & F. JUDGE.
CALIPERING GAGE FOR SCREW THREADS.
APPLICATION FILED JUNE 19, 1913.

1,090,180.

Patented Mar. 17, 1914.
3 SHEETS—SHEET 3.

WITNESSES.

INVENTORS.
Frank O. Wells and
Franklin Judge.
BY
ATTORNEY.

UNITED STATES PATENT OFFICE.

FRANK O. WELLS AND FRANKLIN JUDGE, OF GREENFIELD, MASSACHUSETTS.

CALIPERING-GAGE FOR SCREW-THREADS.

1,090,180.  Specification of Letters Patent.  Patented Mar. 17, 1914.

Application filed June 19, 1913. Serial No. 774,576

*To all whom it may concern:*

Be it known that we, FRANK O. WELLS and FRANKLIN JUDGE, citizens of the United States of America, residing at Greenfield, in the county of Franklin and State of Massachusetts, have invented new and useful Improvements in Calipering-Gages for Screw-Threads, of which the following is a specification.

This invention relates to improvements in calipering or gage devices for measuring or comparing the pitch and the diameters of threads.

The object of the invention is to quickly and accurately determine the variation in pitch and diameter of the threads measured. The nut of a bolt will not accurately fit unless the pitch or lead of the screw is equal in both elements.

Broadly, the invention consists in the combination of a standard threaded element together with a movable measuring device, preferably such a measuring device as will give a multiplied reading of the movable measuring device. It is preferable to set the standard threaded element a distance away from the measuring device, determined by a standard element having a desired diameter and pitch, so that the measuring device will be set to zero. The standard element used to set the apparatus is threaded to measure perfectly with the threads of the first-named standard threaded element, and the measuring device is designed to enter one of the teeth of the second-mentioned standard in a diametrically opposite position. With the apparatus thus set, any threaded element can be compared with the standard by resting it squarely between the standard threaded element and the movable measuring device. If there is any variation in the threads of the element compared or in the diameter of that element, or both, the movable measuring device will take a position indicating the degree of variation as compared to the standard. If, however, the threaded element which is to be measured has a pitch either longer or shorter than the standard pitch and also a diameter smaller than the standard element, then it is necessary to have a second gaging device set within minimum limits through which the small-sized element cannot pass.

By means of this apparatus, threaded elements that do not vary in size within the prescribed or desired limits of accuracy are quickly sorted from those having the desired accuracy, and it is not necessary to have skilled labor in making these very accurate comparisons.

Figure 2:
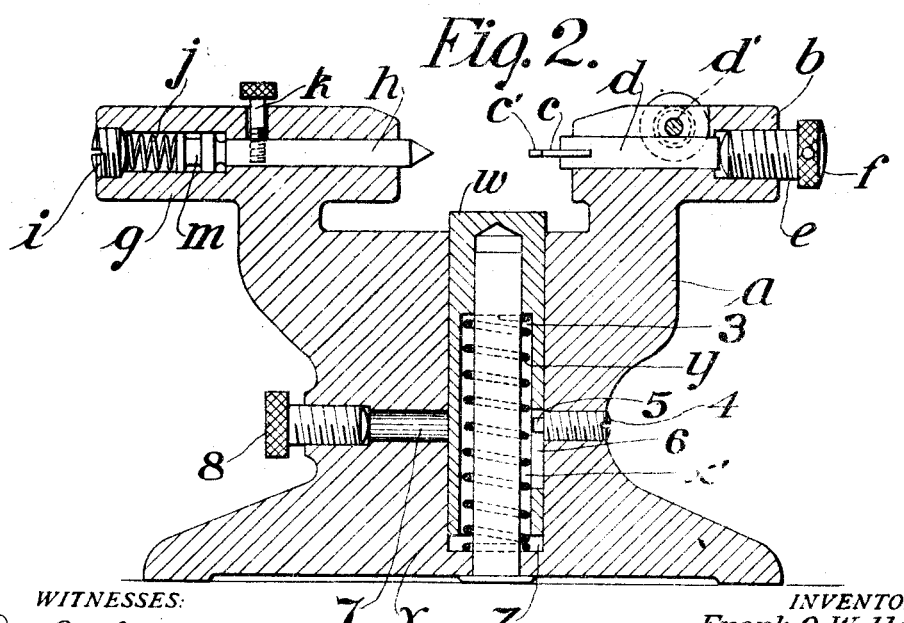
Figure 5:
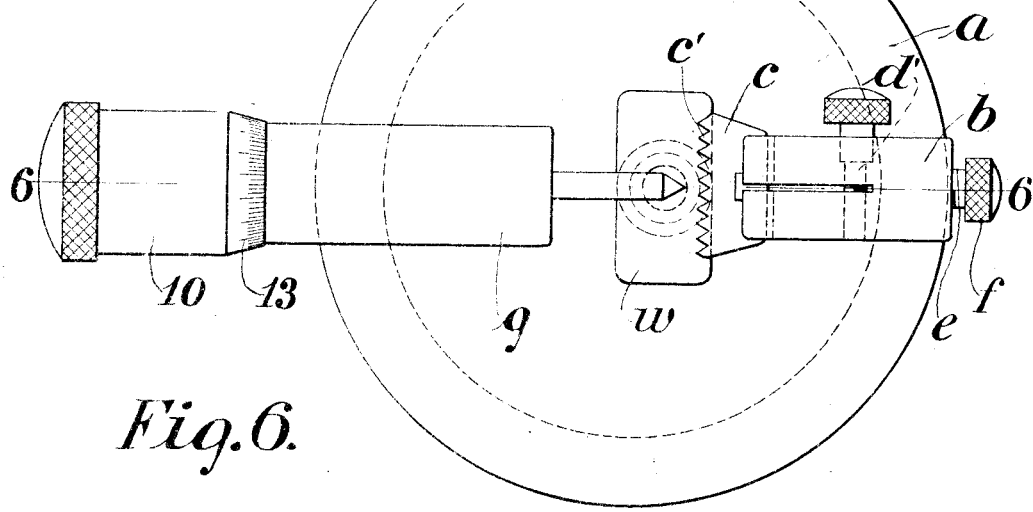
Figure 6:
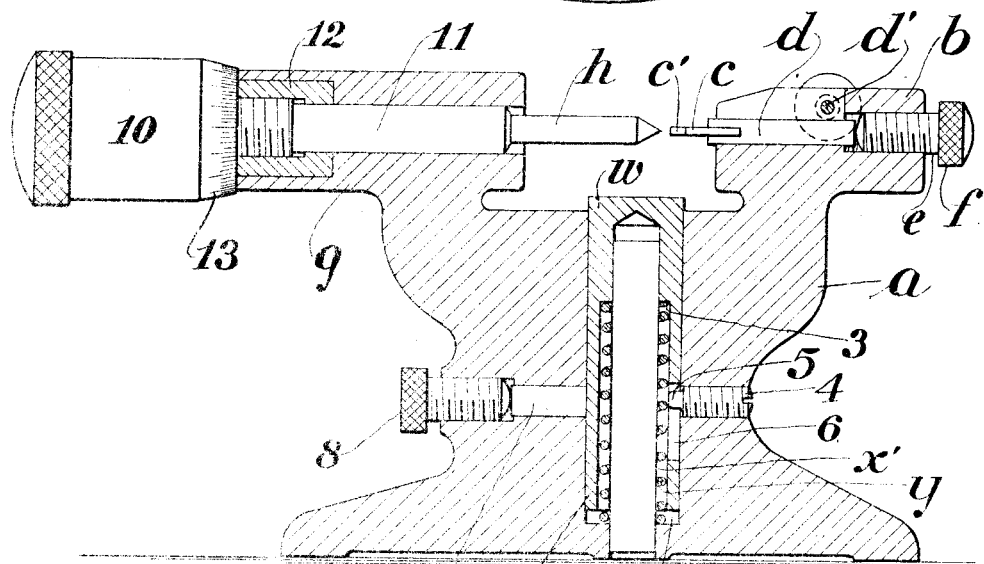

In the drawings, Figure 1 is a plan view showing the adjustable comb member and the movable element to which the pointer is attached. Fig. 2 is a vertical sectional view on the line 2—2 of Fig. 1, showing in side elevation the comb or standard threaded member and the movable member. It also shows a vertically-movable platform on which the thread to be measured is placed, this platform being adjustable for threads of different diameters. Fig. 3 is a plan view of a modification in which two sets of comb-members are used instead of as in Fig. 1, where one is a comb and the other a movable cone-shaped member. Fig. 4 is a vertical sectional view of a further modification showing the two sets of gage devices, it being understood that in Figs. 3 and 4 a pointer is used to indicate the size of the thread being measured, as shown in Fig. 1,— the construction shown in this figure being designed to indicate the maximum and minimum sizes. Fig. 5 is a plan view of a further modification in which a micrometer is used instead of a pointer. Fig. 6 is a sectional view on the line 6—6 of Fig. 5.

Referring to the drawings, $a$ designates the base-portion of the instrument, and mounted in the arm $b$ is a movable comb-member $c$ which is secured to a rod $d$; located back of the rod $d$ is an adjusting-screw $e$ having a knurled head $f$. By rotating the head $f$ the comb member $c$ can be adjusted. This comb is provided with teeth $c^1$ to receive the thread of the screw that is to be measured. The teeth $c'$ of the comb $c$ are accurately formed with relation to the standard and thread and it may, therefore, be considered a standard thread itself. Located oppositely to the arm-member $b$ is a second arm-member $g$ in which is mounted a slidable cone or measuring element $h$ which is located in line with the standard comb-member $c$, and arranged back of this cone-member $h$ is an adjusting-screw $i$, and between the screw $i$ and the outer end of the cone-member $h$ is a coiled compression-spring $j$, the purpose of which is to automatically move the cone-member $h$ inward toward the comb-member $c$.

In order to limit the forward movement of the cone-member $h$, a threaded pin $k$ is employed, which passes down through an enlarged opening in the arm $g$, its lower end being threaded into the cone-member $h$. The outer end of the cone-member $h$ is formed with an annular groove $m$ which receives the arm $o$ of the lever $p$, this lever being pivoted at the point $q$. The outer end of the lever $p$ is notched, as indicated at $r$, to receive the rounded end $s$ of the pointer $t$. This pointer is arranged to swing over a scale $u$ and is normally held in its center or zero position by means of a spring $v$. Arranged in the base-portion of the instrument is a vertically-movable table $w$ on which the thread to be measured is placed so that the axis of the thread is parallel with the contact members. This table is secured to a depending portion $x$ in which is formed a recess $x^1$ to receive an elevating spring $y$, the lower end of which rests upon the bottom of the opening $z$ in the base $a$, and its upper end engages the shoulder 3 at the upper end of the opening $x$ in the table $w$.

In order to limit the upward movement of the table $w$, a set-screw 4—the inner end of which is formed with a projection 5—enters the slot 6 in the wall of the part $x$. For the purpose of clamping the table $w$, a pin 7 is arranged to be forced against the outer wall of the depending portion of the table by frictional resistance. To accomplish this purpose, a set-screw 8 is employed for exerting the necessary pressure on the pin 7 which engages the depending part $x$.

From the construction and arrangement of the comb-member $c$ and the pointer or cone-member $h$ it will be seen that the movement of the table $w$ is at right angles to the line passing through the two first-mentioned members.

For the purpose of measuring the diameter of a thread, the same is inserted between the members $c$ and $h$, the standard teeth of the comb entering or bearing against the walls of the thread on one side and the cone-member $h$ on the other. If the thread being measured is the correct size as to pitch and diameter, the pointer $t$ will remain at the middle or zero position. If it is over or under size, it will be elevated or depressed accordingly. The graduations on the scale $u$ may be either in millimeters or fractional parts of an inch, as desired.

In using the measuring gage shown in Figs. 1 and 2, a standard thread is inserted in the space between the standard comb $c$ and the cone-shaped member $h$. The set-screw $d^1$ is loosened and the milled head $f$ rotated to move the comb-member $c$ against the standard thread until the pointer $t$ stands in the zero position. The instrument is now set or adjusted to a standard or correct space between the members $c$ and $h$. The set-screw $d^1$ is now tightened. In this carefully adjusted position the gage is given to the workman for testing the diameter and pitch of other screw-threads, as taps. When a thread to be tested is inserted, the workman can instantly determine from the pointer on the scale $u$ whether or not it is over or under size, and how much. It should be stated, in adjusting the gage, that the fit both as to diameter and pitch between the standard thread, the comb $c$ and cone $h$ is perfect. By means of this gage an unskilled workman can readily determine the allowable or passable fit of a thread.

In Fig. 3 is shown a slight modification in which, instead of using contacts one of which is a comb-member and the other a pointed or cone-shaped member, the contacts comprise two comb-members $c$ and $c^2$ formed with standard threads,—the member $c^2$ being mounted on the movable cone-shaped member $h$ which moves the pointer shown in Fig. 1. The mode of using this form of gage is the same as that already described under Figs. 1 and 2. The advantages in using the two comb-members is that a larger number of teeth are brought into engagement with the thread being measured, thus insuring greater accuracy in determining the pitch and diameter of the thread under consideration.

Referring now to the construction shown in Fig. 4, in which two pairs of contacts are employed,—these contacts are employed when the pitch and diameter of the threaded elements to be measured have a pitch either longer or shorter than the standard pitch, and also a diameter smaller than the standard thread. In this figure the comb- and cone-members $c$ and $h$ are the same as in Fig. 1, and the same pointer construction is employed. Below the contact members $c$ and $h$ are located a second pair of gage members, in which 3 and 4 are a pair of movable members adapted to be adjusted by the screws 5 and 6 and retained in their adjusted position by means of the set-screws $7^1$ and $8^1$. Located in the member 3 is a grooved roller 9 to receive the threads of the screw to be measured, and located below the members 3 and 4 is a vertical-movable platform $w^1$ that is operated in the same manner as the platform $w$ in Fig. 1.

The manner of operation of the gage shown in Fig. 4 is as follows: The space between the members 3 and 4 is adjusted to a minimum distance through which the smallest sized thread to be measured cannot pass. That is to say, if a thread to be measured passes through between the members 3 and 4, its diameter is too small and must be discarded. The distance between the members $c$ and $h$ is set to receive a thread to be measured, that has a pitch slightly larger than the pitch of the standard thread, while the distance between the members 3 and 4 is set to reject a thread whose diameter is too small. If a thread to be measured passes between the members $c$ and $h$ and not between the members 3 and 4, it is considered passable. If it passes through the space between the fixed members 3 and 4, it is considered too small and should be discarded. This form of gage, therefore, enables unskilled labor to quickly determine whether or not threaded elements vary in size within the desired limits of accuracy.

In using the gages herein described it is to be understood that the required pressure that is exerted by the contact members on the standard threaded member is one that is considered correct, and that the judgment of the workman on this point is entirely eliminated.

Referring to the modification of the calipering device shown in Figs. 5 and 6, in which a micrometer measuring device is employed instead of the pointer construction shown in Figs. 1 and 2. In this construction the standard threaded element or comb $c$ and the movable cone-shaped thread-engaging member $h$ are employed. Connected with the member $h$ is a micrometer measuring device, indicated, as a whole, by the numeral 10. A threaded connection between the spindle 11 and the threaded sleeve 12 is made for the purpose of moving the cone-shaped thread engaging member $h$ into contact with the threaded element that is being measured, when this threaded element is placed in contact with the standard threaded comb-member $c$. By means of the micrometer graduations indicated at 13 the exact size of the finished thread may be determined. The construction shown in this modification may be used in the same manner as the constructions shown in the other figures. That is to say, the micrometer may be set, or accurately adjusted to a certain accurate reading on the scale 13, to indicate a definite size thread, as, say, one-half inch. This reading having been accurately made in advance by inserting a thread of standard size between the members $c$ and $h$, the workman can then readily determine, when another thread is inserted between these members, how much it is under or over size, if any, when compared with the reading on the micrometer that indicates the correct size of thread. This method is not, of course, as rapid as that already referred to in connection with the pointer construction shown in Figs. 1 and 2; but it does give the workman, however, a very accurate instrument by which to determine the correct size of a thread. By means of the construction shown in Figs. 5 and 6, the micrometer would preferably be set at the zero reading and the comb $c$ moved against the opposite side of the inserted standard thread until a perfect fit is obtained, or the permissible frictional contact. When another thread is inserted, its size as to diameter and pitch, either above or below the zero reading, could be very quickly compared with this zero reading and any variation in size from the standard determined. This construction, therefore, permits the accurate sorting of threaded elements. After the micrometer is adjusted, it is not necessary to employ highly skilled labor to make these readings for sorting the threads. In this modification the movable table $w$ is employed, as in the other figures, and on which the thread to be measured is placed, as already described.

What we claim, is,—

1. A thread-gage, comprising in combination, a base or supporting member contact members to engage the walls of the threads to be measured, one of said members being movable, a pointer device operable from the movable member, means to fixedly adjust the other member, and means to bring the axis of the thread being measured in the same plane as the contact members.

2. In a screw-thread measuring-gage, the combination, of a base-member, thread-receiving members, one of said members being comb-shaped to receive the threads and the opposite one formed with a cone-shaped end, means to move the latter member toward the former, means to limit its movement, a pointer, operable connections between the same and the cone-shaped member, and a movable and adjustable table on which the screw-thread to be measured is placed.

3. In a screw-thread measuring-device to determine its permissible maximum and minimum dimensions, the combination, of a base-member, two pair of thread-receiving members mounted therein and arranged one above the other, a comb-member on one of the members of the upper pair to receive the walls of the thread, the other member of the upper pair of thread-receiving members being cone-shaped and movable, a grooved roller on one of the members of the lower pair, and its opposite or mate being cone-shaped and fixed.

4. A gage-device for measuring screw-threads and comprising, a base-member, an adjustable comb-member to receive and bear against the walls of the thread to be measured, a movable member designed and arranged to engage the walls of the thread on the opposite side of the comb-member and operable from the screw-threads being measured, a pointer movable over a suitable scale to indicate the size of the thread, an operable connection between the pointer and the movable member, a table-member on which the thread is placed while being measured, and means to adjust the table-member in a direction parallel with the axis of the thread.

FRANK O. WELLS.
FRANKLIN JUDGE.

Witnesses:
CHARLES N. STODDARD,
JESSIE S. BLACKMER.